(12) United States Patent
Zimmermann et al.

(10) Patent No.: US 12,152,627 B2
(45) Date of Patent: Nov. 26, 2024

(54) FASTENING DEVICE HAVING A BASE PART AND A BLOCKING PART

(71) Applicant: Fidlock GmbH, Hannover (DE)

(72) Inventors: Lasse Zimmermann, Hannover (DE); Breido Botkus, Hannover (DE); Joachim Fiedler, Hannover (DE)

(73) Assignee: Fidlock GmbH, Hannover (DE)

( * ) Notice: Subject to any disclaimer, the term of this patent is extended or adjusted under 35 U.S.C. 154(b) by 937 days.

(21) Appl. No.: 17/047,718

(22) PCT Filed: Apr. 4, 2019

(86) PCT No.: PCT/EP2019/058510
§ 371 (c)(1),
(2) Date: Oct. 15, 2020

(87) PCT Pub. No.: WO2019/201613
PCT Pub. Date: Oct. 24, 2019

(65) Prior Publication Data
US 2021/0140456 A1    May 13, 2021

(30) Foreign Application Priority Data
Apr. 18, 2018 (DE) ............. 10 2018 205 929.2

(51) Int. Cl.
*F16B 5/06* (2006.01)
*B62J 15/02* (2006.01)

(52) U.S. Cl.
CPC ............. *F16B 5/0621* (2013.01); *B62J 15/02* (2013.01)

(58) Field of Classification Search
CPC ..................... F16B 5/0621; F16B 21/065
See application file for complete search history.

(56) References Cited

U.S. PATENT DOCUMENTS

| 3,057,650 A | * | 10/1962 | Ahlgren | E05C 19/16 |
| | | | | 292/251.5 |
| 3,376,615 A | * | 4/1968 | Heckman | E05B 47/004 |
| | | | | 215/354 |

(Continued)

FOREIGN PATENT DOCUMENTS

| CN | 102449324 B | * | 10/2015 | .......... F16B 19/1081 |
| DE | 29516952 U1 | * | 2/1997 | ............ F16B 21/065 |

(Continued)

*Primary Examiner* — Matthew R McMahon
(74) *Attorney, Agent, or Firm* — The Webb Law Firm

(57) ABSTRACT

A fastening device includes a base part and a fastening assembly, which can be fitted to each other along a fitting direction, and at least one latching element which is arranged on the base part or the fastening assembly. The base part and the fastening assembly in a fitted position are positively connected to each other via the at least one latching element. There is additionally provided a blocking part which in the fitted position of the base part and the fastening assembly can be connected to the base part, where at least one of the base part and/or the fastening assembly includes a first magnetic element and the blocking part includes a second magnetic element, which cooperate with each other in a magnetically attracting manner when the base part and the blocking part are connected to each other, where the blocking part includes a fixing element.

8 Claims, 15 Drawing Sheets

(56) References Cited

U.S. PATENT DOCUMENTS

| | | | | |
|---|---|---|---|---|
| 5,259,689 | A * | 11/1993 | Arand | F16D 1/033 |
| | | | | 403/337 |
| 8,495,803 | B2 * | 7/2013 | Fiedler | H01F 7/0263 |
| | | | | 70/160 |
| 8,866,011 | B2 * | 10/2014 | Liu | F16B 21/02 |
| | | | | 174/50 |
| 9,572,410 | B2 * | 2/2017 | Fiedler | E05B 37/12 |
| 10,007,084 | B2 * | 6/2018 | Lang | G02B 7/182 |
| 10,179,548 | B2 * | 1/2019 | Fiedler | F16B 9/054 |
| 10,315,549 | B2 * | 6/2019 | Fiedler | B60N 3/046 |
| 11,297,909 | B2 * | 4/2022 | Heineke | A44B 17/0017 |
| 11,525,470 | B2 * | 12/2022 | Richter | F16M 13/02 |
| 2011/0030174 | A1 | 2/2011 | Fiedler | |
| 2017/0015229 | A1 | 1/2017 | Fiedler | |
| 2017/0059814 | A1 | 3/2017 | Lang et al. | |
| 2018/0178868 | A1 | 6/2018 | Hsu | |
| 2018/0363689 | A1 | 12/2018 | Richter et al. | |

FOREIGN PATENT DOCUMENTS

| | | | | |
|---|---|---|---|---|
| DE | 102008006135 A1 | 7/2009 | | |
| DE | 102008019063 A1 | 10/2009 | | |
| DE | 102014103181 A1 | 9/2015 | | |
| DE | 102015216145 A1 | 3/2017 | | |
| DE | 102015225438 A1 | 6/2017 | | |
| DE | 202017104413 U1 | 8/2017 | | |
| FR | 2352201 A1 * | 12/1977 | | F16B 21/065 |
| WO | WO-9004722 A1 * | 5/1990 | | |
| WO | WO-2020099896 A1 * | 5/2020 | | |

\* cited by examiner

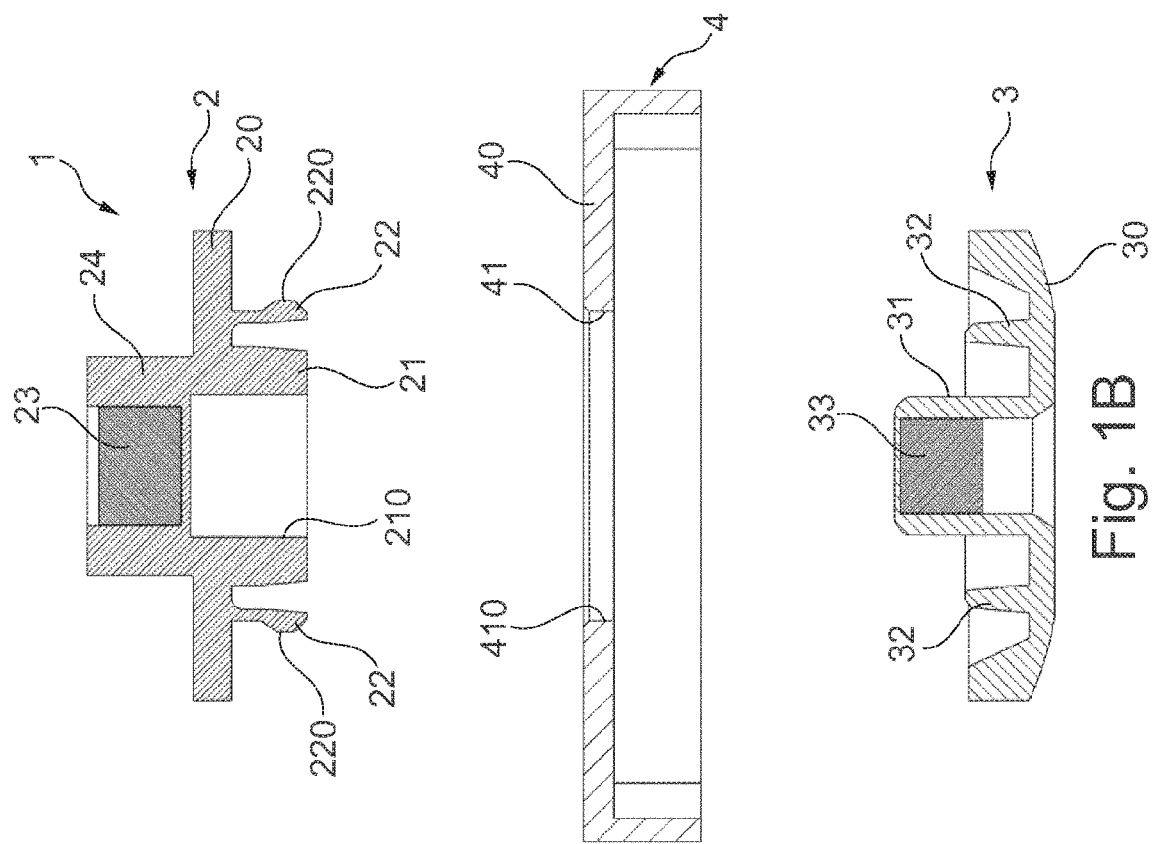
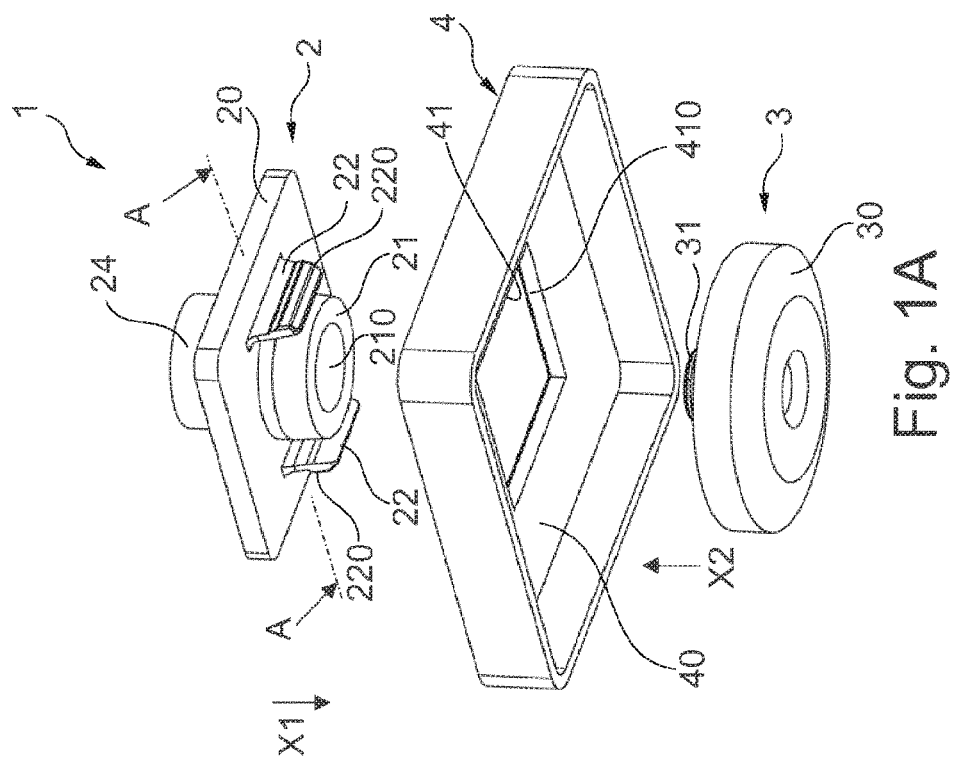

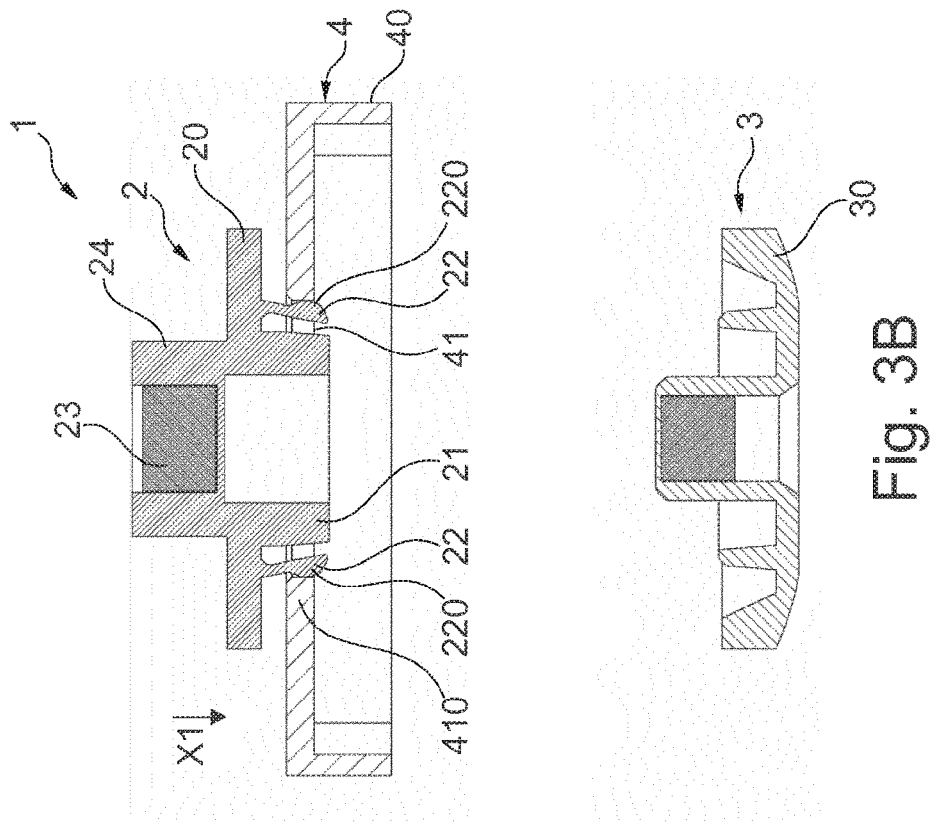
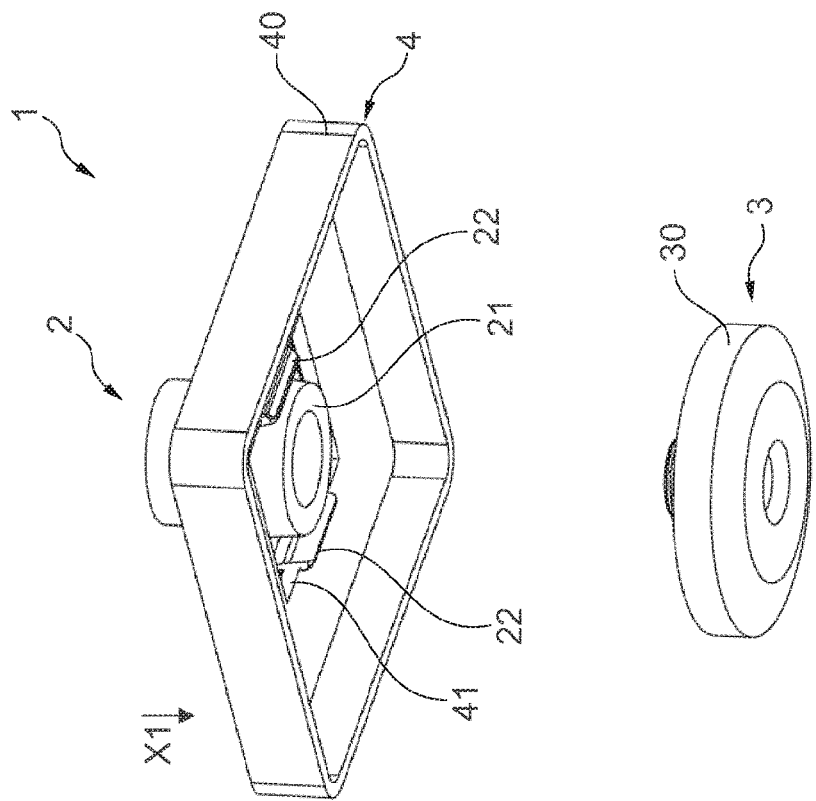
Fig. 3B
Fig. 3A

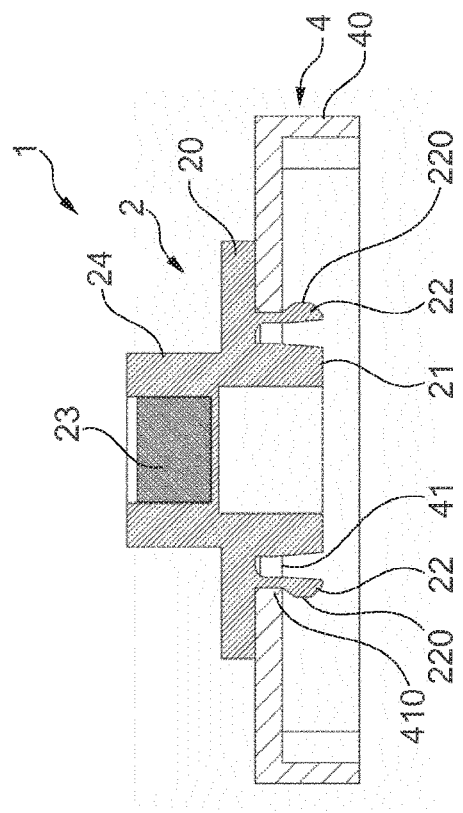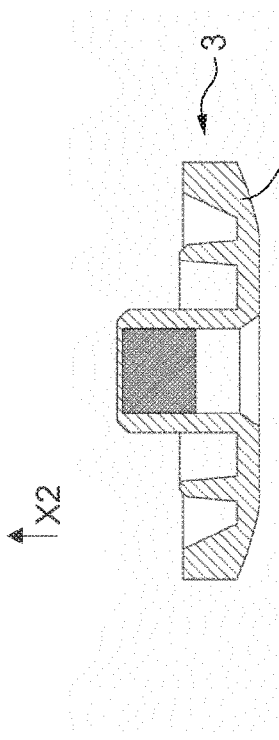
Fig. 4B
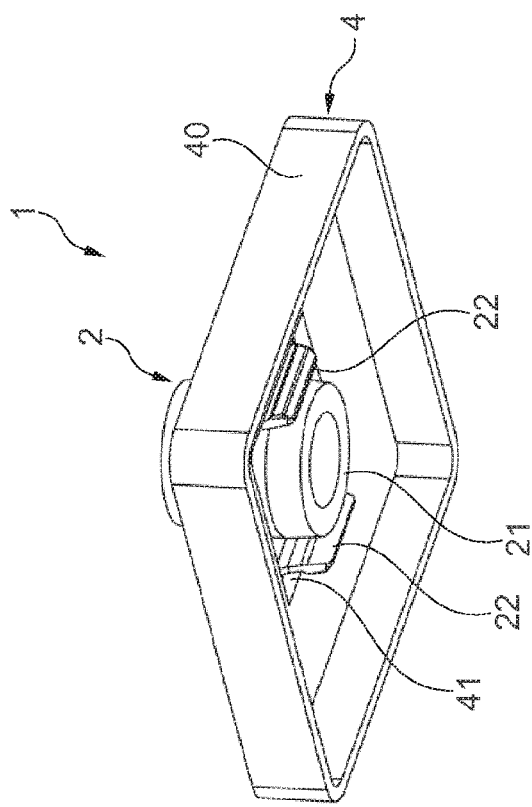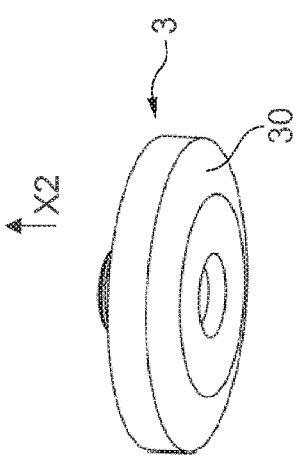
Fig. 4A

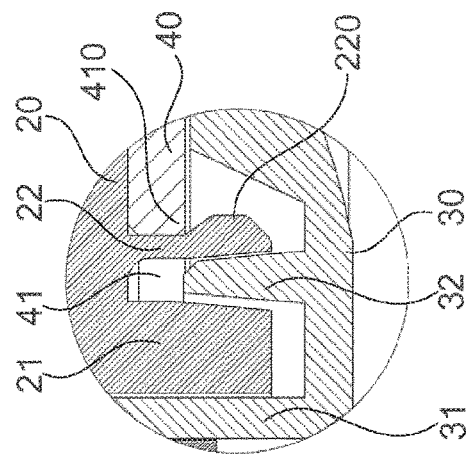
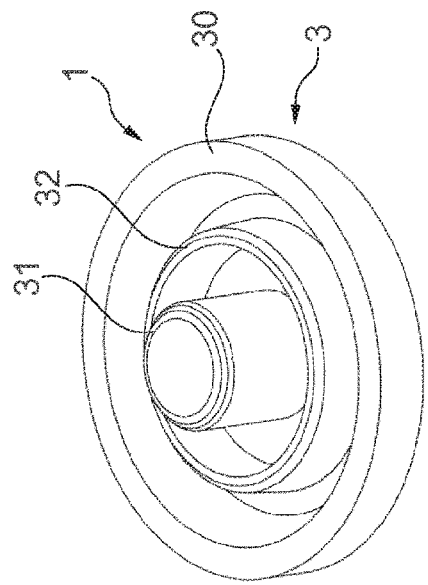
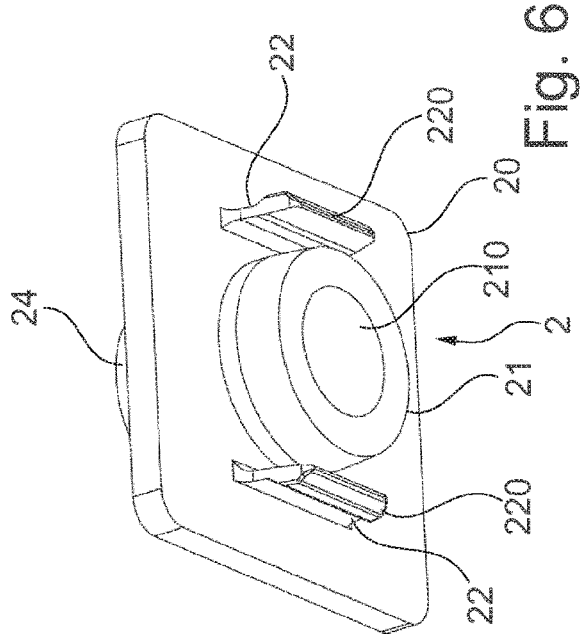
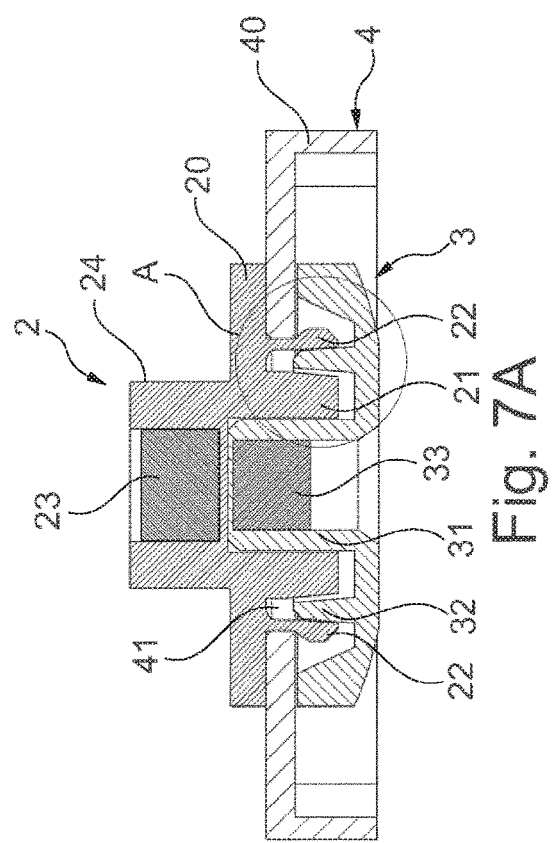

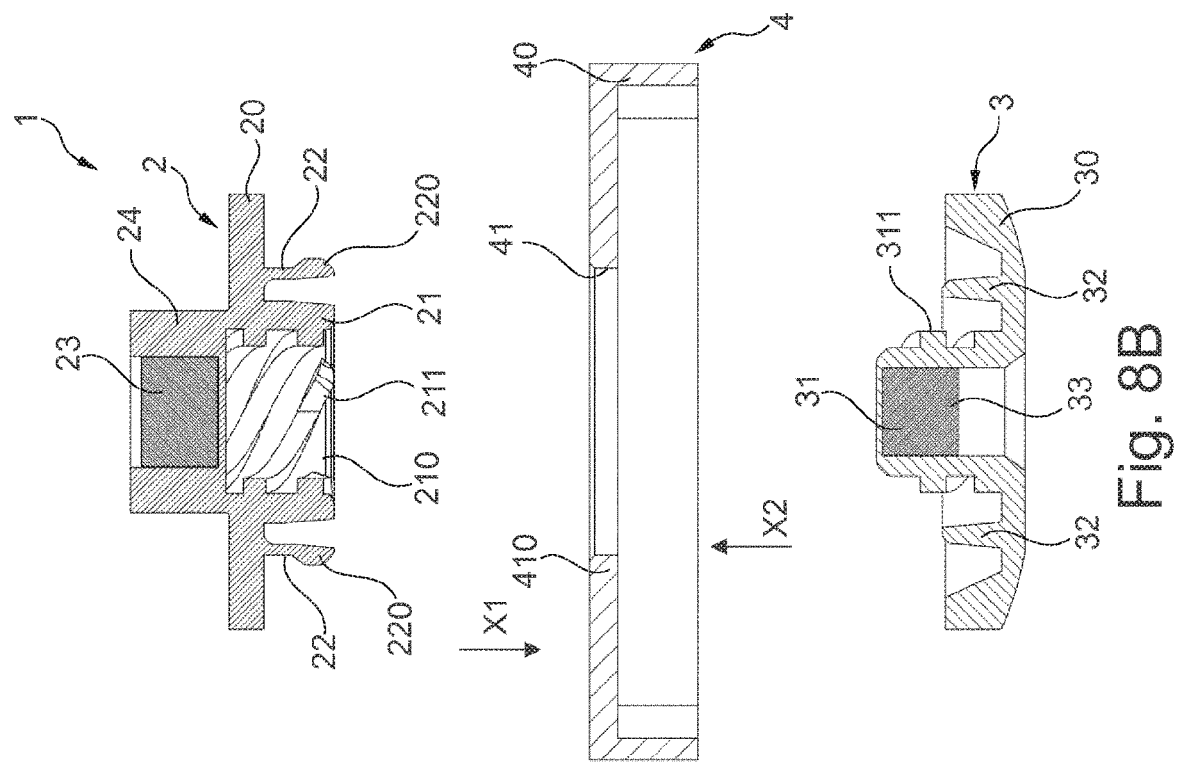
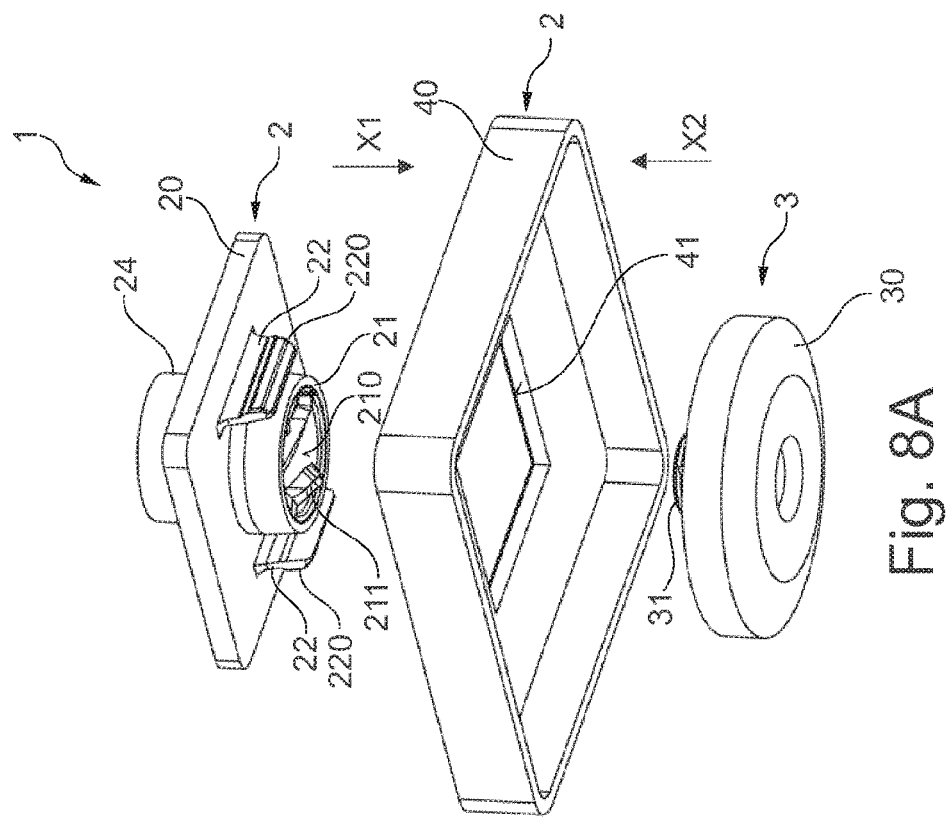

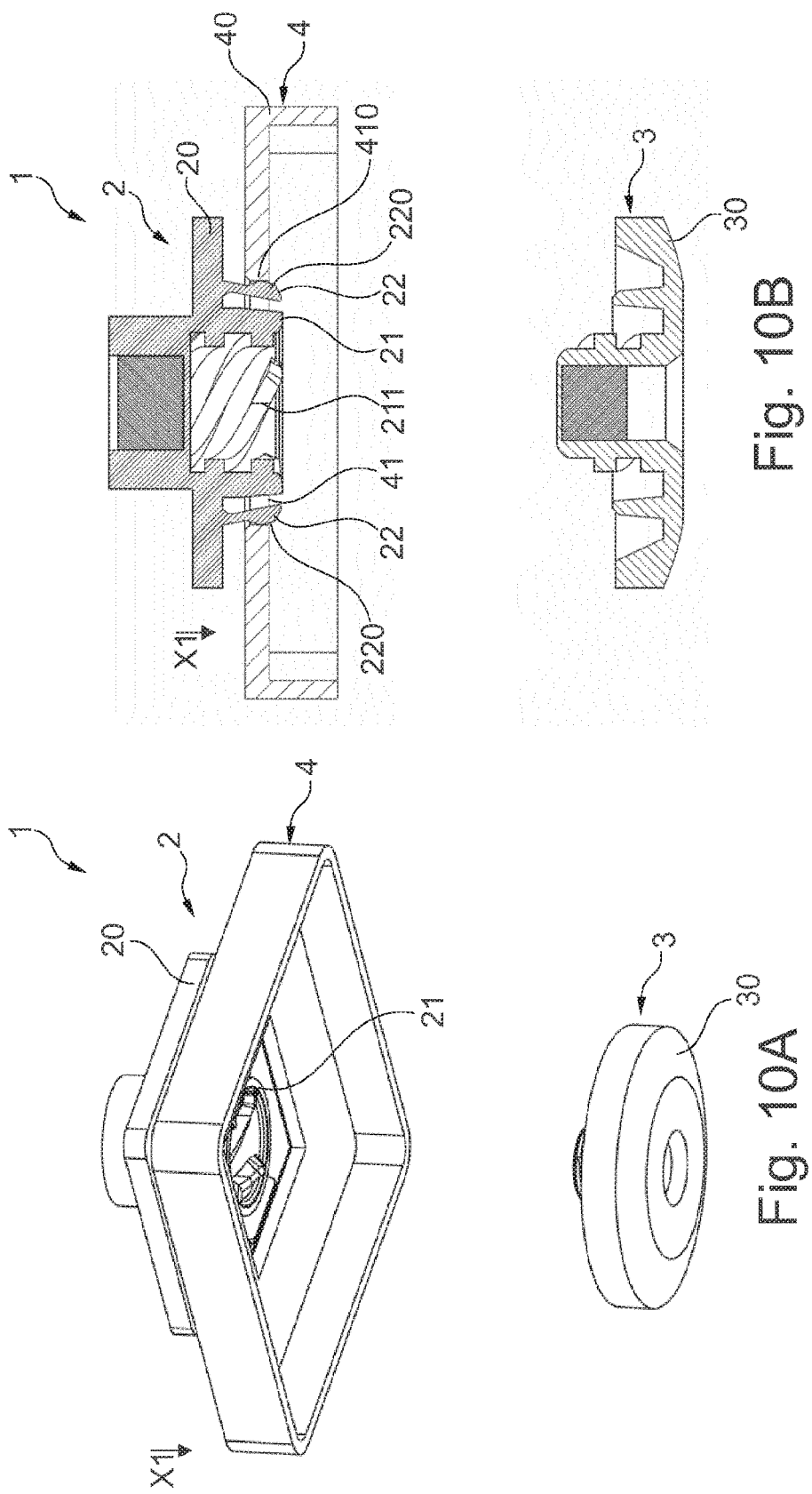

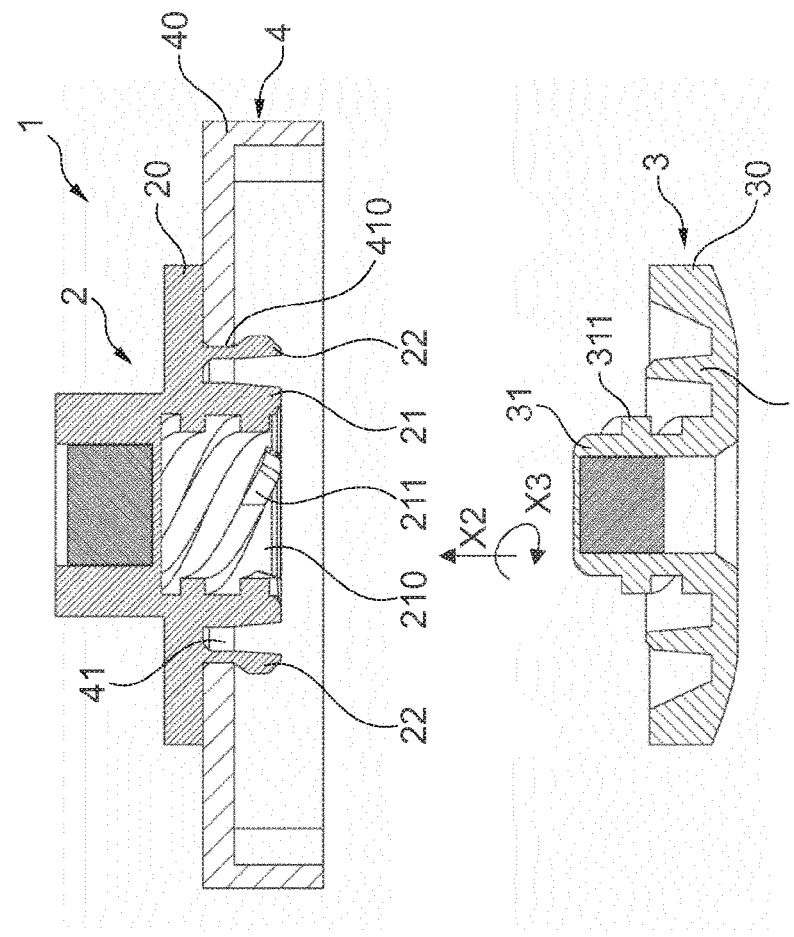
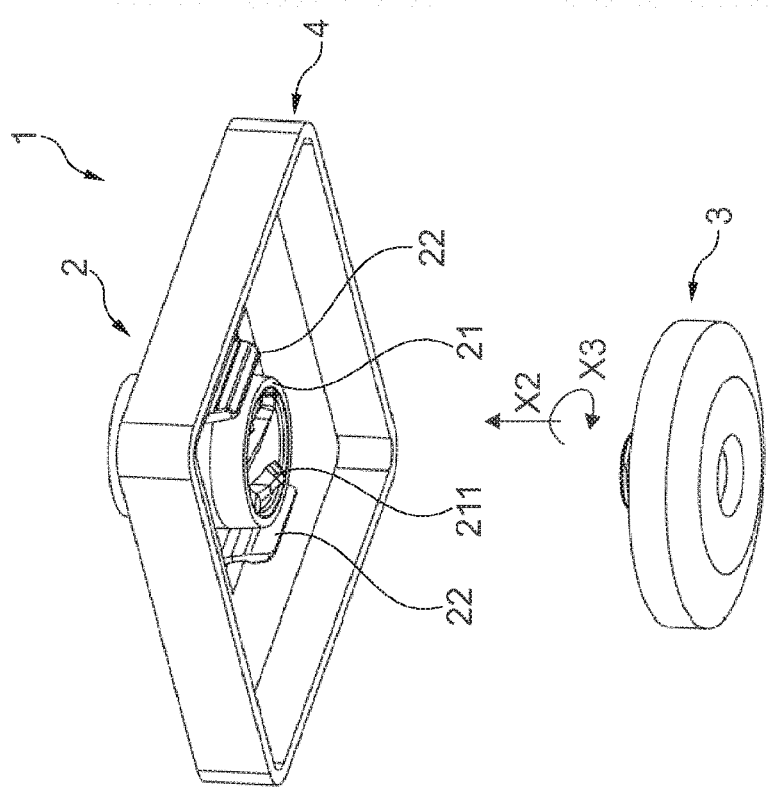
Fig. 11A
Fig. 11B

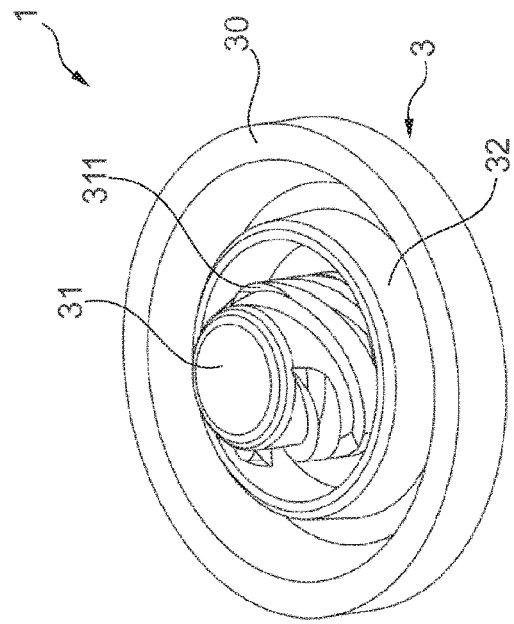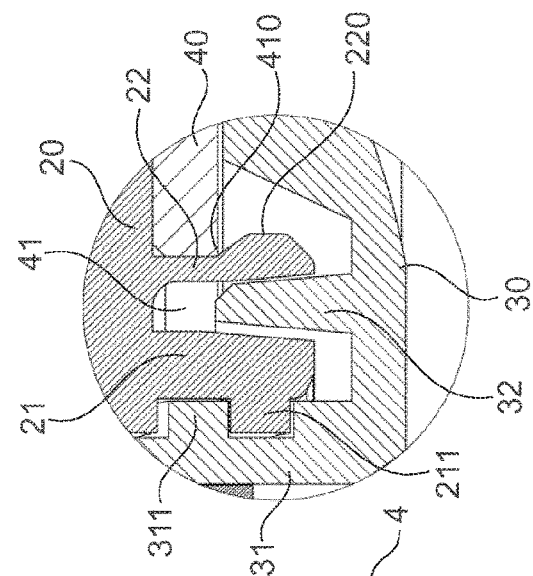
Fig. 14
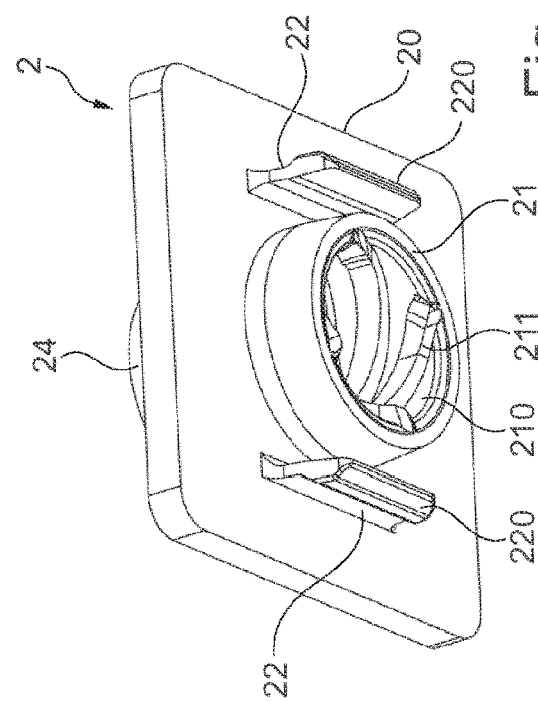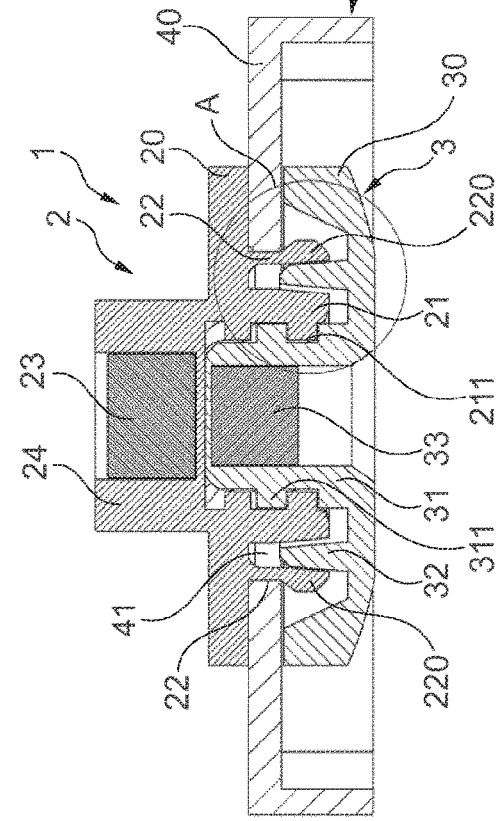
Fig. 15A
Fig. 15B

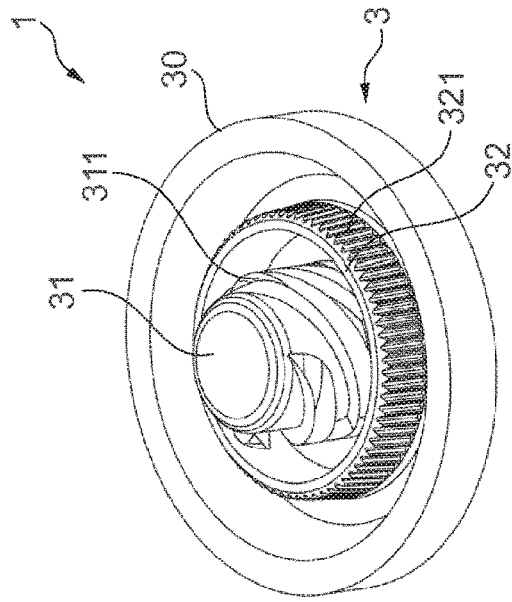
Fig. 16
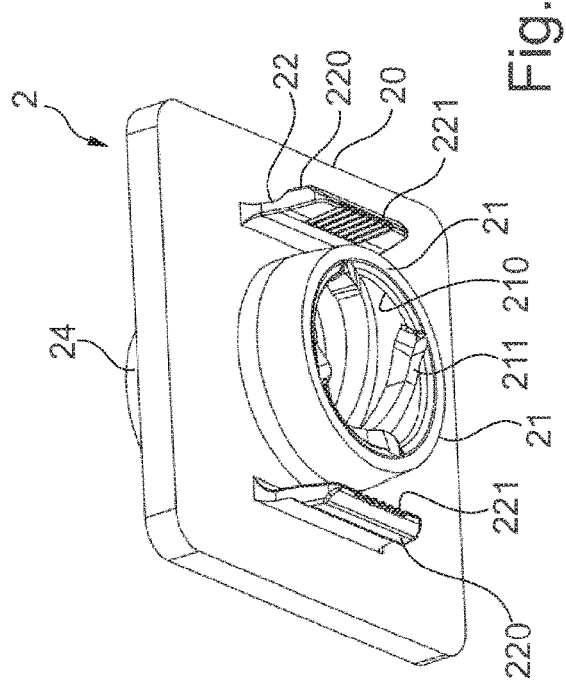
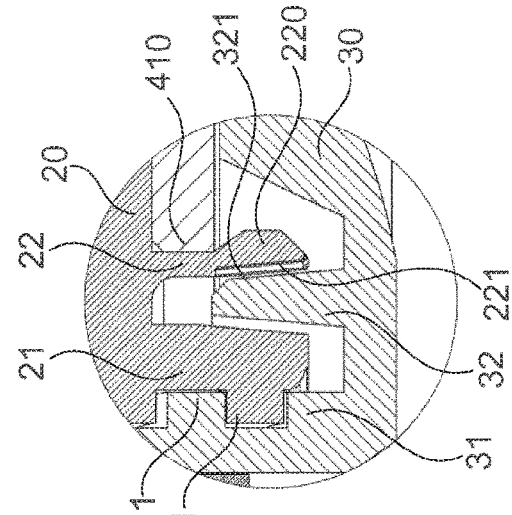
Fig. 17B
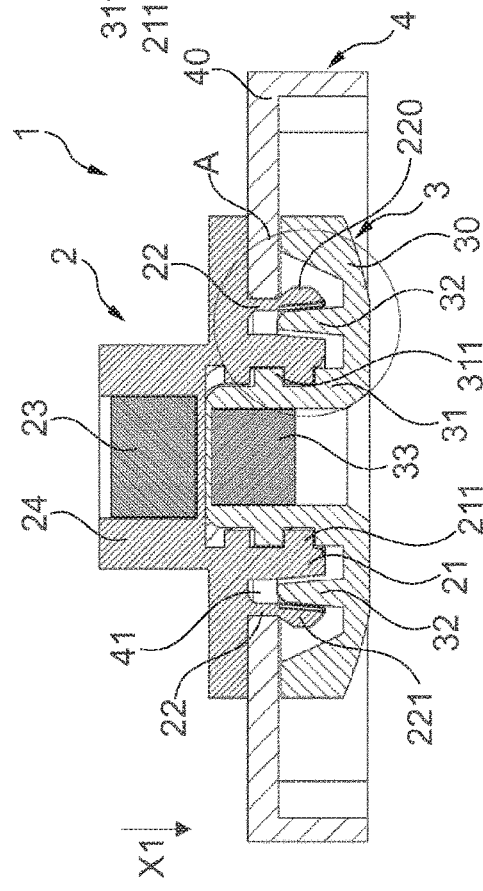
Fig. 17A

FASTENING DEVICE HAVING A BASE PART AND A BLOCKING PART

CROSS-REFERENCE TO RELATED APPLICATIONS

This application is the United States national phase of International Application No. PCT/EP2019/058510 filed Apr. 4, 2019, and claims priority to German Patent Application No. 10 2018 205 929.2 filed Apr. 18, 2018, the disclosures of which are hereby incorporated by reference in their entirety.

BACKGROUND OF THE INVENTION

Field of the Invention

This present disclosure relates to a fastening device.

Description of Related Art

Such a fastening device comprises a base part and a fastening assembly, which can be attached to each other along a fitting direction. On the base part or the fastening assembly at least one latching element is arranged, which serves to produce a positive connection between the base part and the fastening assembly in a position in which the base part and the fastening assembly are fitted to each other.

Such a fastening device can be used, for example, to fasten a fender to a bicycle. For example, it can be provided to fasten the base part to a fork stem, for example on the underside of a fork stem in the region of the front fork, in order to fix the fastening assembly in the form of the fender to the fork stem and hence in the region of the front wheel of the bicycle via the base part.

What is desirable here is a fastening device which on the one hand ensures a firm arrangement of the fastening assembly on an associated, superordinate assembly, for example on a fork stem, when the fastening assembly, for example a fender, is mounted. Secondly, it is desirable to design the fastening device in a detachable manner, so that a fender, for example, also can easily be removed again.

SUMMARY OF THE INVENTION

It is an object underlying the proposed solution to provide a fastening device which allows reliable fastening and is easy to use for a user, in particular to produce and again also release the fastening.

This object is achieved by a fastening device with the features as described herein.

Accordingly, the fastening device comprises a blocking part which in the fitted position of the base part and the fastening assembly can be connected to the base part, wherein the base part and/or the fastening assembly includes a first magnetic element and the blocking part includes a second magnetic element, which cooperate with each other in a magnetically attracting manner when the base part and the blocking part are connected to each other, wherein the blocking part includes a fixing element which is designed to cooperate with the at least one latching element in order to block the positive connection between the base part and the fastening assembly.

The blocking part serves to secure the connection between the base part and the fastening assembly via the at least one latching element. For this purpose, the blocking part includes a fixing element which acts on the at least one latching element, when the blocking part is connected to the base part, in such a way that the latching element cannot easily be released, and thus the positive connection between the base part and the fastening assembly is secured.

One or more latching elements can be arranged on the base part and/or the fastening assembly.

The fastening assembly for example can be an item, for example a fender, to be fastened to a vehicle, for example to a two-wheeler, in particular to a bicycle. The base part on the other hand can be arranged for example on the vehicle, for example on the bicycle, so as to provide for a (releasable) arrangement of the fastening assembly on the vehicle via the base part.

To arrange the fastening assembly on a superordinate assembly, to which the base part is fixed, it is possible for example to first arrange the fastening assembly on the base part on the superordinate assembly, whereby a positive connection between the base part and the fastening assembly is produced via the at least one latching element. The blocking part then is fitted to the base part in such a way that the blocking part interacts with the at least one latching element by means of its fixing element, and thus the positive connection produced via the at least one latching element is locked via the fixing element.

When the blocking part is in position on the base part, the form fit produced via the at least one latching element cannot be released, because the at least one latching element is held in position via the fixing element. The form fit between the base part and the fastening assembly can be removed only after releasing the blocking part so that the fastening assembly, for example a fender, can be released from the base part.

The fitting of the blocking part to the base part is magnetically supported due to the fact that on the base part and/or the fastening assembly a first magnetic element is arranged and on the blocking part a second magnetic element is arranged. When fitting the blocking part to the base part, the magnetic elements cooperate in a magnetically attracting manner so that the blocking part for example is automatically drawn towards the base part and thus is connected to the base part.

The magnetic elements for example can each be designed by a permanent magnet, for example a neodymium magnet. It is also conceivable, however, that one magnetic element is fabricated as a permanent magnet, whereas the other magnetic element is fabricated as a (passive) ferromagnetic armature.

In one embodiment the blocking part, when it is connected to the base part, is retained at the base part and/or the fastening assembly solely due to the magnetic forces of the magnetic elements. In this case, the connection between the blocking part and the base part thus is produced (solely) via the magnetic elements.

Because the blocking part cooperates with the base part in a magnetically attracting manner, an easy and comfortable handling for fitting the blocking part to the base part is obtained for a user. The blocking part is detachable from the base part by removing the blocking part from the base part against the magnetic forces.

In one embodiment the base part includes a body and an engaging portion with an engagement opening, which protrudes from the body. For example, the blocking part likewise can have a body, wherein the body of the base part and the body of the blocking part come to lie on sides of the fastening assembly facing away from each other, when the blocking part is fitted to the base part.

The blocking part can include an engaging element for engaging into the engagement opening of the base part. The engaging element for example can be of peg-shaped design.

In one embodiment, the blocking part can be connected to the base part by inserting the engaging element into the engagement opening of the engaging portion of the base part. This is effected in a magnetically supported way by action of the magnetic elements of the base part and of the blocking part, wherein in the connected position the blocking part is magnetically retained at the base part.

In one embodiment, the base part can include a first thread means in the form of one or more thread turns, while the blocking part includes a second thread means, for example likewise in the form of one or more thread turns or in the form of an e.g. peg-shaped guide element for interaction with the thread means of the base part. Via such thread means, the blocking part and the base part can be screwingly connected to each other, which can further simplify the handling for a user and also can increase the strength of the fastening device.

By the threaded engagement between the base part and the blocking part in particular the strength of the connection can be improved under a shock load, because a shock load cannot easily lead to the release of the connection of the blocking part with the base part. Because a user can unscrew the blocking part from the base part in order to release the blocking part from the base part, releasing the blocking part is simplified for a user, because by screwingly removing the blocking part from the base part the magnetic forces of the magnetic elements can be overcome in a way convenient for a user.

In one embodiment, the fastening assembly includes a fastening opening into which the at least one latching element engages in the fitted position. The fastening assembly for example can include a surface portion into which the fastening opening is molded. In this case, one or more latching elements are arranged on the base part and engage into the fastening opening when the base part and the fastening assembly are fitted to each other.

The positive connection between the base part and the fastening assembly in this case is produced by the fact that in the fitted position the one or more latching elements positively enclose an edge portion defining the fastening opening so that the base part and the fastening assembly, for example a fender of a bicycle, are positively held against each other.

When the base part and the fastening assembly in the fitted position—but before connecting the blocking part to the base part—are fitted to each other, the positive connection produced via the at least one latching element is not (yet) secured and thus temporary so that the fastening assembly also might be released again from the base part in a simple way. To secure the connection of the fastening assembly to the base part, the blocking part is fitted to the base part in such a way that the fixing element acts on the at least one latching element and fixes the same in its form fit, for example by the fact that the fixing element holds the at least one latching element in engagement with the edge portion defining the fastening opening of the fastening assembly. The at least one latching element thus cannot be disengaged from the edge portion so that the base part and the fastening assembly are reliably and loadably connected to each other.

In one embodiment, the base part includes two latching elements for cooperating with opposed edge portions of the fastening assembly. When the blocking part is connected to the base part, the fixing element can come to lie between the latching elements so that the fixing element fixes the latching elements in their position relative to the edge portions of the fastening assembly and thus secures the positive engagement of the latching elements with the edge portions of the fastening assembly.

In one embodiment, the at least one latching element is elastically deflectable in particular transversely to the fitting direction. When fitting the base part and the fastening assembly to each other, the at least one latching element can be deformed elastically (to a sufficient extent) so that the at least one latching element can latchingly snap into engagement with the respective other part. When the at least one latching element is arranged on the base part, the latching element can be latchingly connected to the fastening assembly in this way. When the at least one latching element on the other hand is arranged on the fastening assembly, the at least one latching element can be latchingly connected to the base part in this way.

The at least one latching element as such can be configured to be elastically resilient. However, it is also conceivable to use a movable latching element spring-loaded via a (separate) spring element.

The at least one latching element includes a form-fit element for example in the form of a latching nose, which serves to produce the positive connection in the fitted position. When the base part and the fastening assembly are fitted to each other, the at least one latching element including the form-fit element for example encloses an associated edge portion of the fastening opening of the fastening assembly so that the positive connection between the base part and the fastening assembly is produced thereby.

In this case, the fixing element preferably is configured to act on a side of the at least one latching element facing away from the form-fit element. By acting on the at least one latching element, the fixing element prevents an elastic deformation of the latching element so that the base part and the fastening assembly cannot be released from each other, in any case not without detaching the blocking part from the base part.

The form-fit element of the latching element can be beveled in such a way that when fitting the same, it automatically gets into engagement with the associated edge portion of the fastening assembly and for this purpose runs up onto the edge portion with a run-up slope. The form-fit element can also be beveled in the release direction so that even on release of the fastening assembly from the base part—with the blocking part detached—the form-fit element runs up onto the edge portion and thus is guided across the edge portion by deflecting the latching element. Alternatively, however, it is also conceivable that the form-fit element is not beveled in the release direction, but for example extends transversely to the release direction, and thus a separate actuation is required to release the latching between the fastening assembly and the base part.

In one embodiment, it is conceivable that the fastening assembly can be connected to the base part in exactly one orientation or in a plurality of discrete, defined orientations. Thus, the fastening assembly can be connected to the base part in only one or a plurality of predetermined positions.

It can be provided that the base part and the fastening assembly, for example in the form of a fender of a bicycle, can be linearly shifted relative to each other in the position fitted to each other. In this way, the position of the fastening assembly relative to the base part can (yet) be adapted also in the fitted position, for example in order to adjust the position of a fender on a bicycle. The linear shiftability can be eliminated when the blocking part is fitted to the base part. In an alternative embodiment, the fastening assembly can, however, also be shifted linearly with respect to the base part when the blocking part is fitted to the base part.

The at least one latching element is not necessarily designed with a form-fit element in the form of a latching nose. It is also conceivable that the at least one latching element includes a form-fit element for example in the form of a toothing or the like, which in the fitted position engages into an associated counter-toothing of the other part, for example of the fastening assembly, wherein the engagement is secured in the connected position of the blocking part.

In one embodiment, the base part or the fastening assembly includes a first form-fit device and the blocking part includes a second form-fit device to prevent a rotation of the blocking part relative to the base part around the fitting direction. For example, the base part or the fastening assembly can include a first form-fit device in the form of a toothing, while the blocking part carries a second form-fit device in the form of a toothing. The form-fit devices of the base part or the fastening assembly on the one hand and of the blocking part on the other hand for example can rattle over each other so that a rotation of the blocking part with respect to the base part or the fastening assembly is made more difficult, but is not inhibited completely.

In another embodiment, a frictional-contact device can also be used instead of such form-fit devices in order to provide a frictional contact between the blocking part and the base part or the fastening assembly.

The first form-fit device of the base part can be formed for example on a side of the at least one latching element facing away from a form-fit element. The second form-fit device of the blocking part on the other hand can be formed for example on the outside of the fixing element. When the blocking part is connected to the base part, the form-fit devices are in engagement with each other so that the blocking part cannot easily be rotated with respect to the base part, in any case not without overcoming the form fit produced by the form-fit devices.

By such form-fit devices, the rotary position of the blocking part with respect to the base part can be secured in addition. When the blocking part is screwingly connected to the base part via thread means on the base part and the blocking part, the screw connection between the base part and the blocking part can additionally be secured in this way.

The form fit between the form-fit devices can even be reinforcing under load so that a release of the connection between the blocking part and the base part is blocked under load.

In one embodiment, the blocking part has a body from which the fixing element protrudes. The fixing element can extend circumferentially around the fitting direction, along which the base part and the fastening assembly can be fitted to each other and the blocking part also can be connected to the base part, and for example can be of ring-shaped design so that the blocking part in principle can be connected to the base part in arbitrary positions without the blocking effect of the fixing element being impaired thereby.

The object is also achieved by a fastening device comprising a base part and a fastening assembly, wherein the base part and the fastening assembly can be fitted to each other and in a fitted position are connected to each other via a screw element. It is provided that the base part includes a first magnetic element and the screw element includes a second magnetic element, which cooperate in a magnetically attracting manner.

In this case, the fastening of the fastening assembly to the base part this is effected via a screw element which cooperates with the base part in a magnetically attracting manner. Via the magnetic elements of the base part and of the screw element the screw connection between the base part and the screw element thus is secured in addition so that in particular in the case of vibrations a release of the screw connection is made more difficult, if not excluded.

This proceeds from the finding that by using magnetic elements, a screw connection possibly can be secured and thus be designed more vibration-resistant. In the case of vibrations, the screw element thus can be released only with difficulty, because by action of the magnetic elements a force is applied onto the same, which pulls the screw element towards the base part.

Such a fastening device in principle can be used in any desired way, for example for fastening a part to a vehicle, for example to a two-wheeler, in particular to a bicycle.

BRIEF DESCRIPTION OF THE DRAWINGS

The idea underlying the solution will be explained in detail below with reference to the exemplary embodiments illustrated in the Figures. It is shown in:

FIG. 1A a view of a first exemplary embodiment of a fastening device;

FIG. 1B a sectional view along line A-A of FIG. 1A;

FIG. 3A a view of the fastening device on further fitting of the base part and the fastening assembly of the fastening device to each other;

FIG. 3B a sectional view of the arrangement of FIG. 3A;

FIG. 4A a view of the fastening device in a fitted position of the base part and the fastening assembly;

FIG. 4B a sectional view of the arrangement of FIG. 4A;

FIG. 6 a view of the fastening device comprising the base part and the blocking part;

FIG. 7A the sectional view of FIG. 5B;

FIG. 7B an enlarged view of the arrangement of FIG. 7A in the section A;

FIG. 8A a view of a second exemplary embodiment of a fastening device;

FIG. 8B a sectional view of FIG. 8A;

FIG. 10A a view of the fastening device on further fitting of the base part and the fastening assembly of the fastening device to each other;

FIG. 10B a sectional view of the arrangement of FIG. 10A;

FIG. 11A a view of the fastening device in a fitted position of the base part and the fastening assembly;

FIG. 11B a sectional view of the arrangement of FIG. 11A;

FIG. 14 a view of the fastening device comprising the base part and the blocking part;

FIG. 15A the sectional view of FIG. 13B;

FIG. 15B an enlarged view of the arrangement of FIG. 15A in the section A;

FIG. 16 a view of another exemplary embodiment of a fastening device comprising a base part and a blocking part;

FIG. 17A a sectional view through the fastening device;

FIG. 17B an enlarged view of the arrangement of FIG. 17A in the section A; and

DESCRIPTION OF THE INVENTION

Figure 2B:
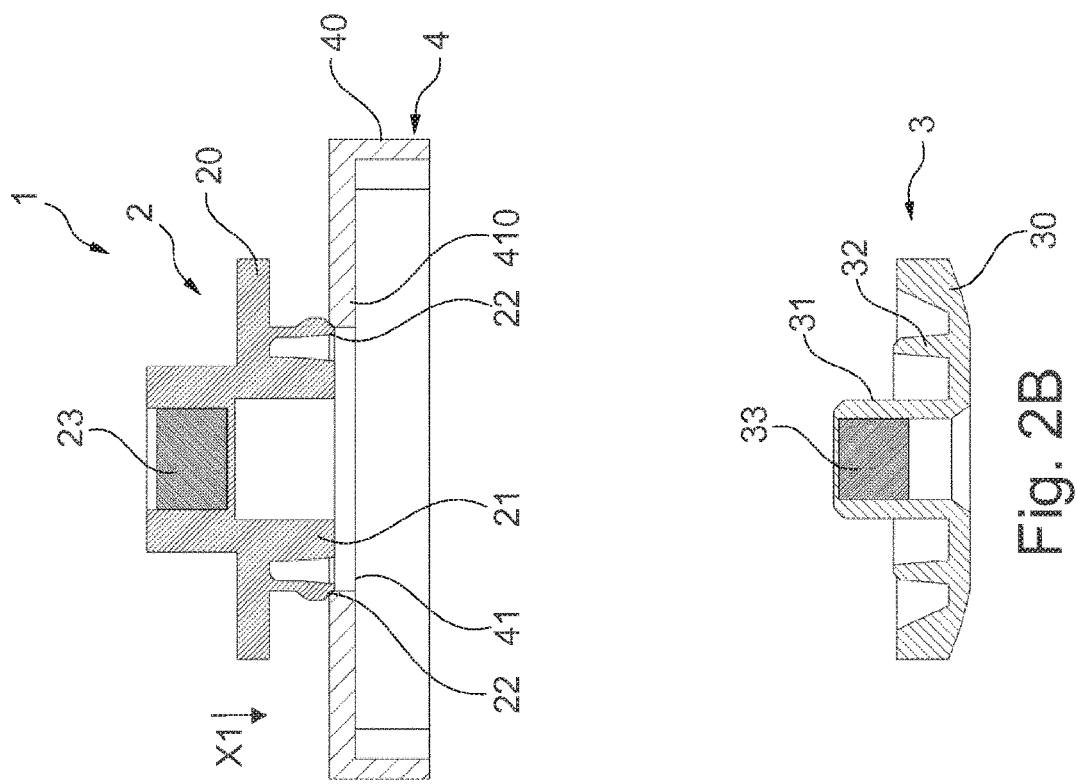
FIG. 2B a sectional view of the arrangement of FIG. 2A.
Figure 2A:
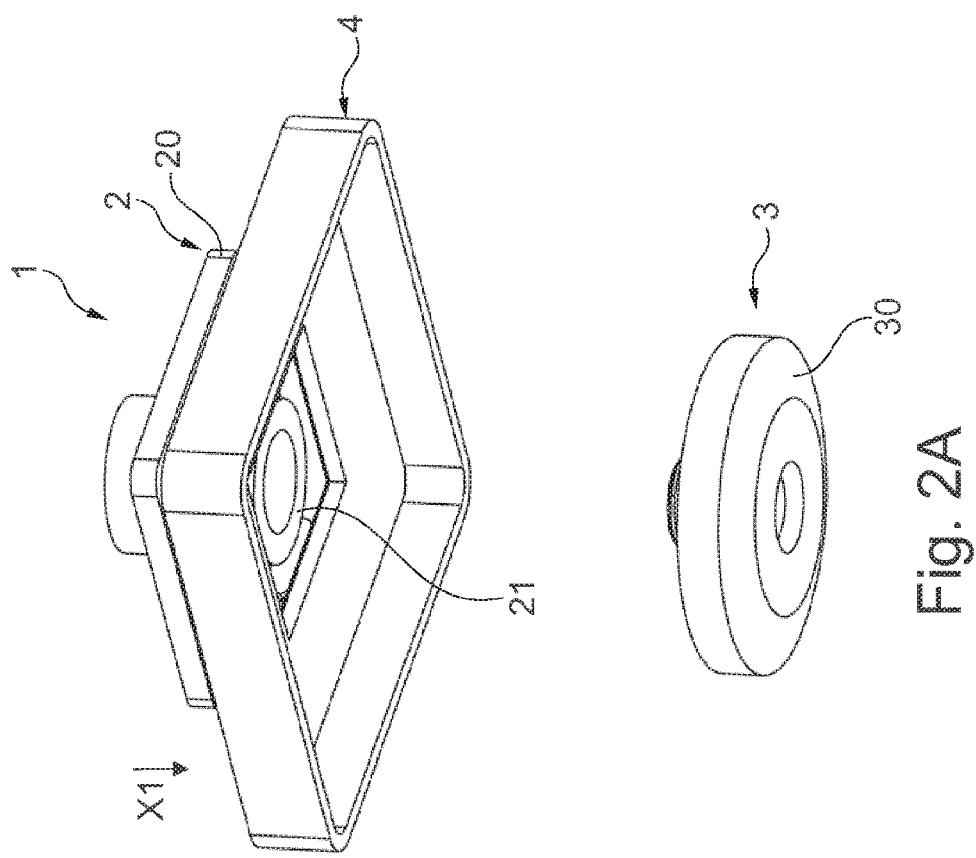
FIG. 2A a view of the fastening device when a base part and a fastening assembly of the fastening device are fitted to each other.

FIGS. 1A, 1B to 7A, 7B show a first exemplary embodiment of a fastening device 1 which includes a base part 2, a fastening assembly 4 and a blocking part 3, as this can be seen for example in FIG. 1A.

In a starting position, the base part 2, the fastening assembly 4 and the blocking part 3 are present separately, as this can be seen in FIGS. 1A and 1B. The base part 2 can be fixed for example to a superordinate assembly, for example to a vehicle, for instance to a two-wheeler, in particular to a bicycle, in order to provide for fastening the fastening assembly 4 to the vehicle via the base part 2. The blocking part 3 then serves for securing the connection between the fastening assembly 4 and the base part 2.

The base part 2 includes a body 20 and an engaging portion 21 in the form of a peg stub, which protrudes from the body 20 in the direction of the fastening assembly 4. Within the substantially cylindrical engaging portion 21 an engagement opening 210 is formed, into which the blocking part 3 can engage with an engaging element 31 in the form of a peg protruding from a body 30 in order to connect the blocking part 3 to the base part 2.

Radially outside the engaging portion 21 two latching elements 22 protrude from the body 20 of the base part 2, which are arranged on diametrically opposed sides of the engaging portion 21 and each include a form-fit element 220 in the form of a latching nose pointing to the outside.

For connecting the fastening assembly 4, for example in the form of a fender, to the base part 2 it is possible to fit the base part 2 and the fastening assembly 4 to each other along a fitting direction X1. When the base part 2 is fixed for example to a vehicle, for instance to a bicycle, the fastening assembly 4 usually is fitted to the base part 2. The latching elements 22 at the body 20 of the base part 2 here get into engagement with an engagement opening 41 in a surface portion 40 of the fastening assembly 4 due to the fact that the form-fit elements 220 in the form of the latching noses at the latching elements 22 engage behind opposed edge portions 410 of the fastening opening 41, as this is shown in the sequence from FIGS. 2A, 2B to FIGS. 4A, 4B.

The latching elements 22 of the base part 2 for example integrally made from plastic material by means of plastic injection molding are elastically deflectable. When fitting the base part 2 and the fastening assembly 4 to each other along the fitting direction X1, the form-fit elements 220 beveled at their ends facing away from the body 20 run up on the associated edge portions 410 and thereby are radially urged to the inside, as this is shown in the transition from FIGS. 2A, 2B towards FIGS. 3A, 3B. On further fitting, the form-fit elements 220 snap into engagement with the edge portions 410 and engage behind the edge portions 410 so that a positive connection is produced between the base part 2 and the fastening assembly 4, as this is shown in FIGS. 4A, 4B.

Figure 5B:
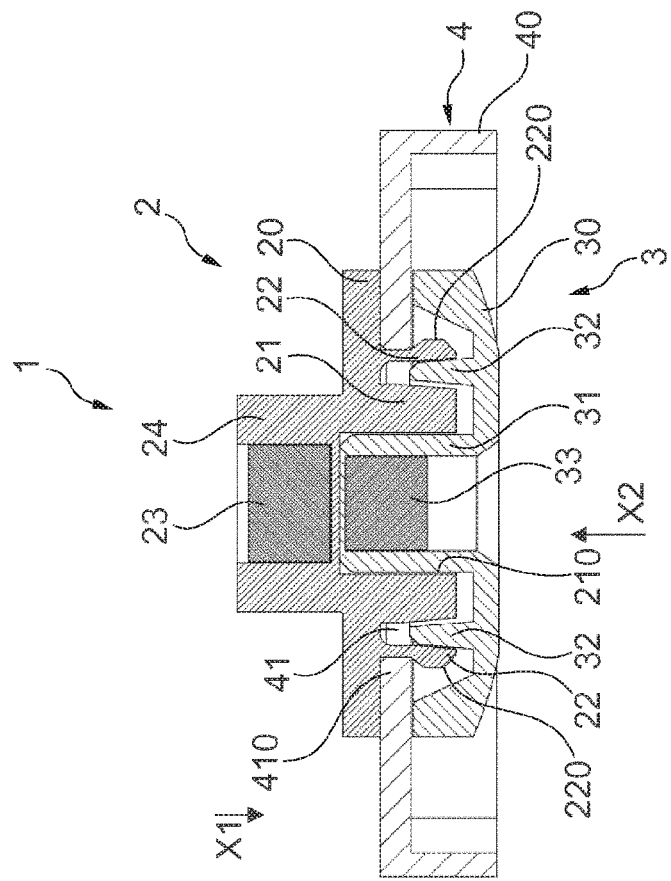
FIG. 5B a sectional view of the arrangement of FIG. 5A.
Figure 5A:
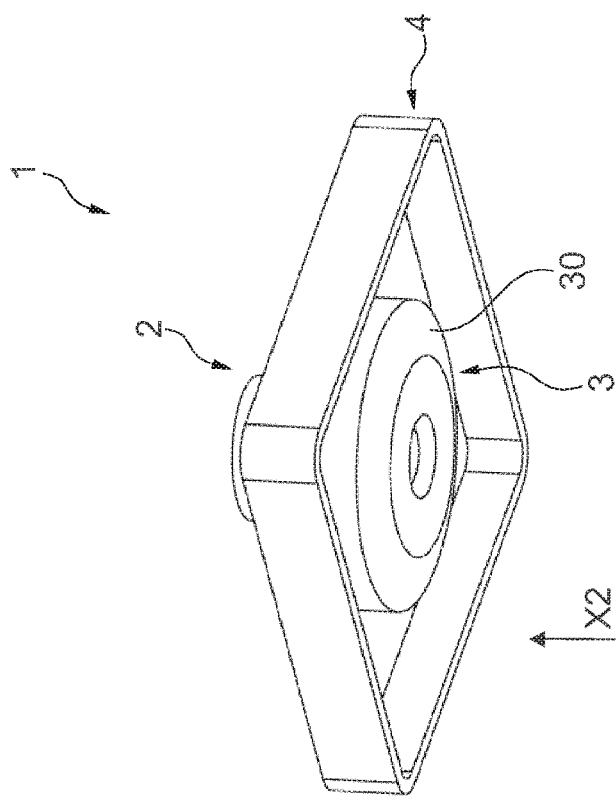
FIG. 5A a view of the fastening device when the blocking part is connected to the base part.
Figure 9B:
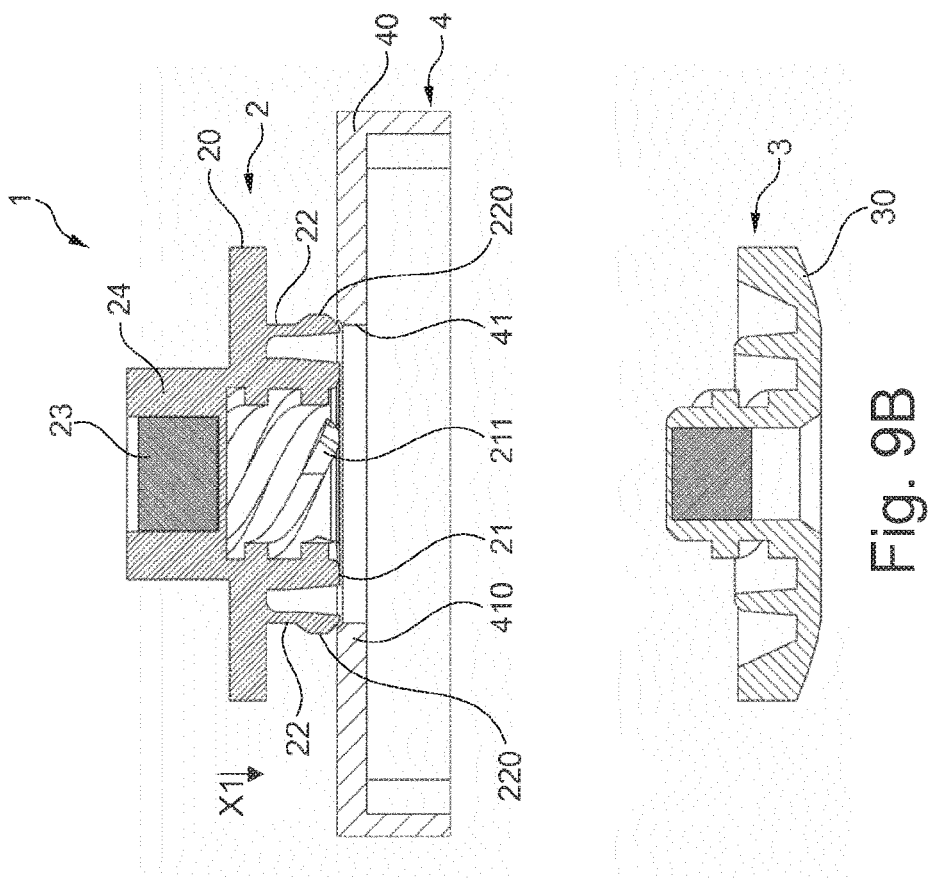
FIG. 9B a sectional view of the arrangement of FIG. 9A.
Figure 9A:
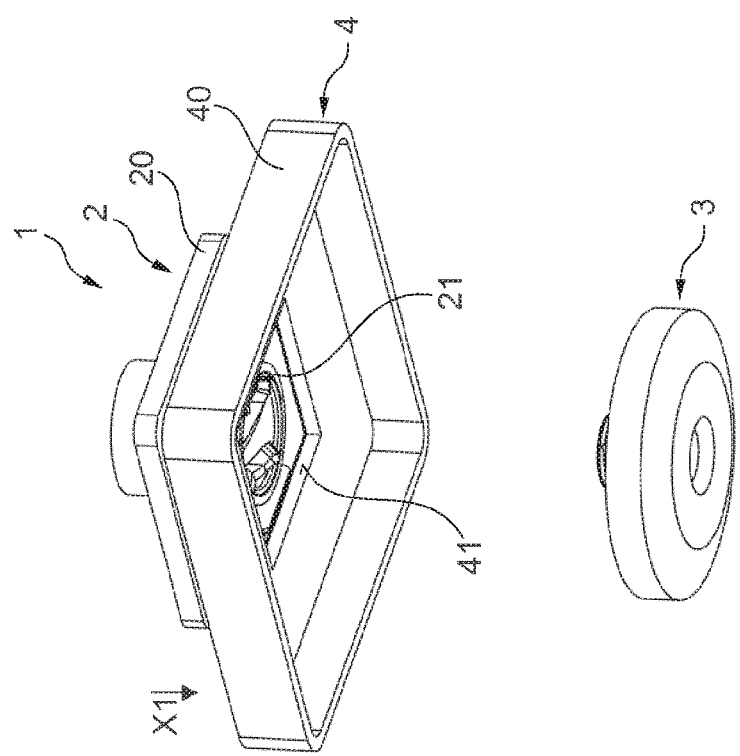
FIG. 9A a view of the fastening device when a base part and a fastening assembly of the fastening device are fitted to each other.
Figure 12B:
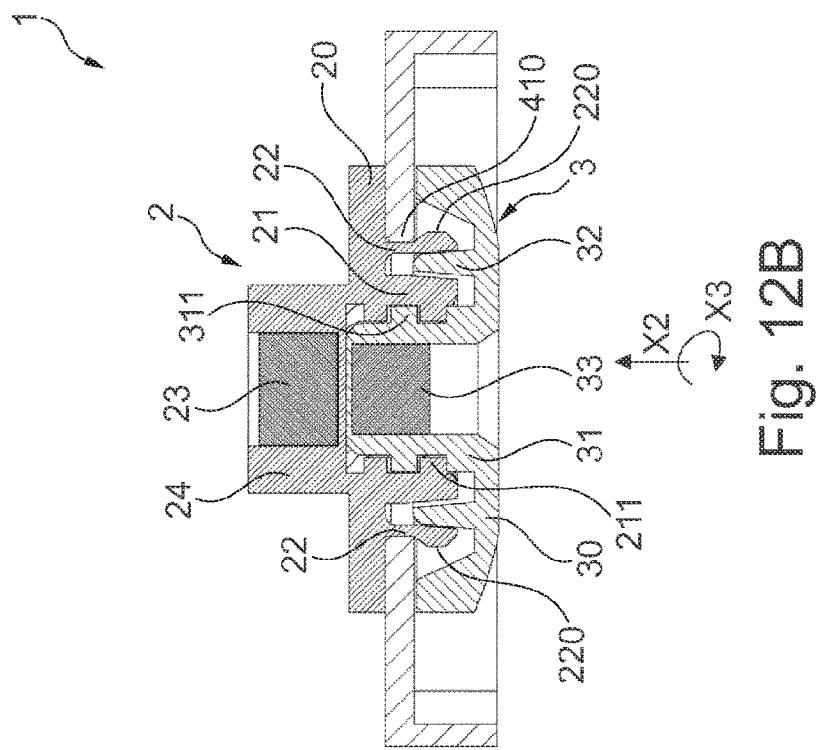
FIG. 12B a sectional view of the arrangement of Fig. 12A.
Figure 12A:
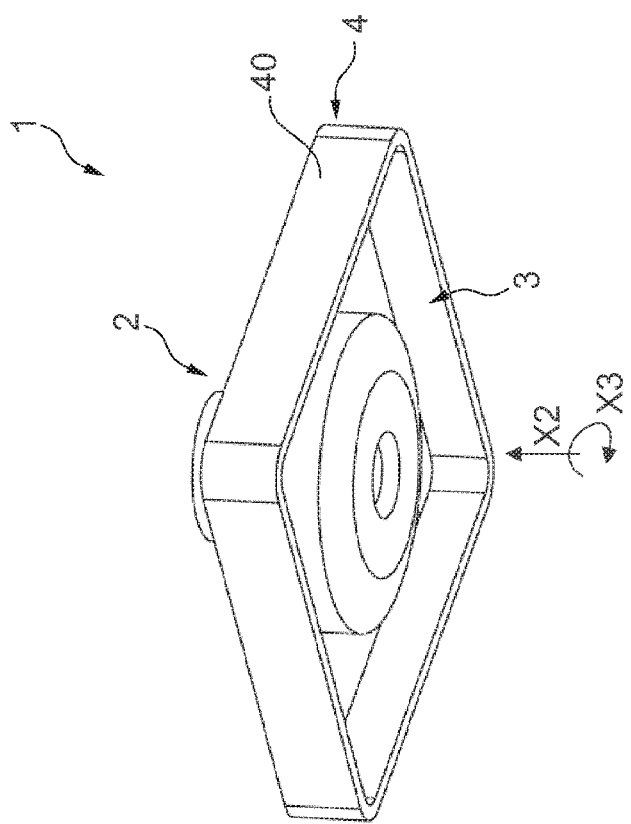
FIG. 12A a view of the fastening device when the blocking part is connected to the base part.

To secure the connection between the base part 2 and the fastening assembly 4, the blocking part 3 then can be fitted to the base part 2 in a fitting direction X2, as this is shown in FIGS. 5A, 5B. On fitting, the engaging element 31 in the form of the peg at the body 30 of the blocking part 3 gets into engagement with the engagement opening 210 in the engaging portion 21 of the base part 2, and a fixing element 32 annularly shaped on the body 30 of the blocking part 3, shown for example in FIG. 6, comes to lie on the inside of the latching elements 22 of the base part 2, as can be taken from FIG. 5B.

When the blocking part 3 is connected, a deflection of the latching elements 22 radially to the inside thus is blocked so that the form fit between the base part 2 and the fastening assembly 4 is secured. Without detaching the blocking part 3, the connection between the base part 2 and the fastening assembly 4 can no longer be released.

In the position secured by the blocking part 3, the base part 2 and the blocking part 3 receive the surface portion 40 of the fastening assembly 4 between them. The connection of the fastening assembly 4 to the base part 2 here is made via the latching elements 22.

When the fastening assembly 4 is loaded along the fitting direction X1 to the base part 2, the latching elements 22 inwardly press against the fixing element 32, but cannot be inwardly deflected beyond the fixing element 32 so that the form-fit elements 220 in the form of the latching noses at the latching elements 22 cannot be moved past the edge portions 410 and the positive connection between the base part 2 and the fastening assembly 4 thus is secured, as can be taken from the views of FIGS. 7A, 7B.

The base part 2 and the blocking part 3 each include a magnetic element 23, 33, which magnetic elements cooperate in a magnetically attracting manner when the blocking part 3 is fitted to the base part 2. The magnetic element 23 of the base part 2 here is received in a peg-shaped receiving portion 24 of the base part 2. The magnetic element 33 of the blocking part 3 is enclosed in the engaging element 31. When the blocking part 3 is fitted to the base part 2, the magnetic elements 23, 33 magnetically attract each other so that the engaging element 31 is automatically drawn into engagement with the engagement opening 210 of the engaging portion 21 of the base part 2 and in the connected position is held in the engagement opening 210.

In this exemplary embodiment the blocking part 3 thus is retained at the base part 2 due to the magnetic forces of the magnetic elements 23, 33.

When the blocking part 3 is to be released from the base part 2, the blocking part 3 can be withdrawn from the base part 2 against the fitting direction X2. For this purpose, the magnetic forces of the magnetic elements 23, 33 must be overcome.

When the blocking part 3 is detached, the form fit between the base part 2 and the fastening assembly 4 can be eliminated so that the fastening assembly 4 can be detached from the base part 2.

In an exemplary embodiment shown in FIGS. 8A, 8B to 15A, 15B the base part 2 includes a first thread means 211 within the engagement opening 210, and the blocking part 3 includes a second thread means 311 on the outside of the engaging element 31, each realized by a plurality of thread turns.

For connecting the blocking part 3 to the base part 2, the engaging element 31 is screwed into the engagement opening 210 in a screwing direction X3 via the thread means 211, 311, as this is shown in the transition from FIGS. 11A, 11B to FIGS. 12A, 12B, wherein the connection is magnetically supported due to the forces of magnetic attraction of the magnetic elements 23, 33 of the base part 2 and the blocking part 3. The pitch of the thread turns of the thread means 211, 311 can be chosen such that due to the forces of magnetic attraction the blocking part 3 is largely automatically drawn into threaded engagement with the engagement opening 210, until the connected position as shown in FIGS. 12A, 12B and 15A, 15B is reached.

Figure 13B:
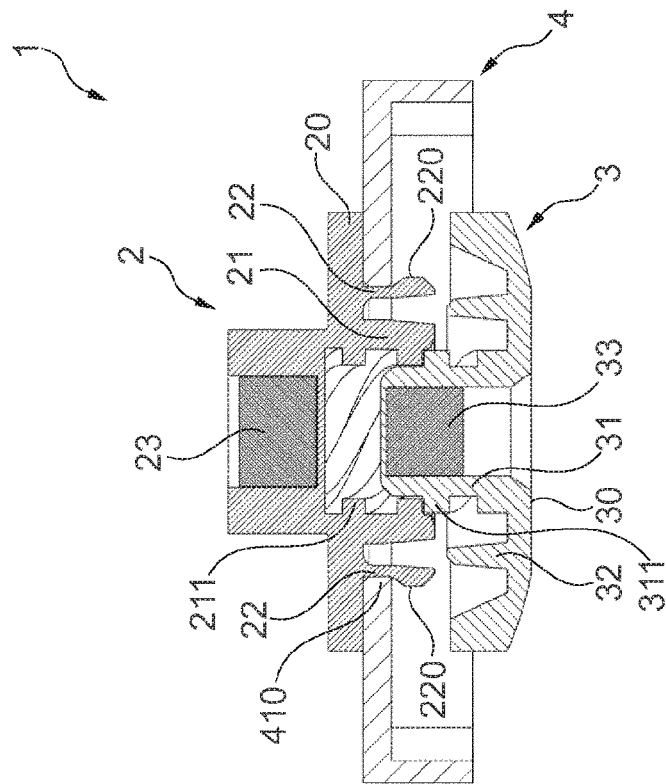
FIG. 13B a sectional view of the arrangement of Fig. 13A.
Figure 13A:
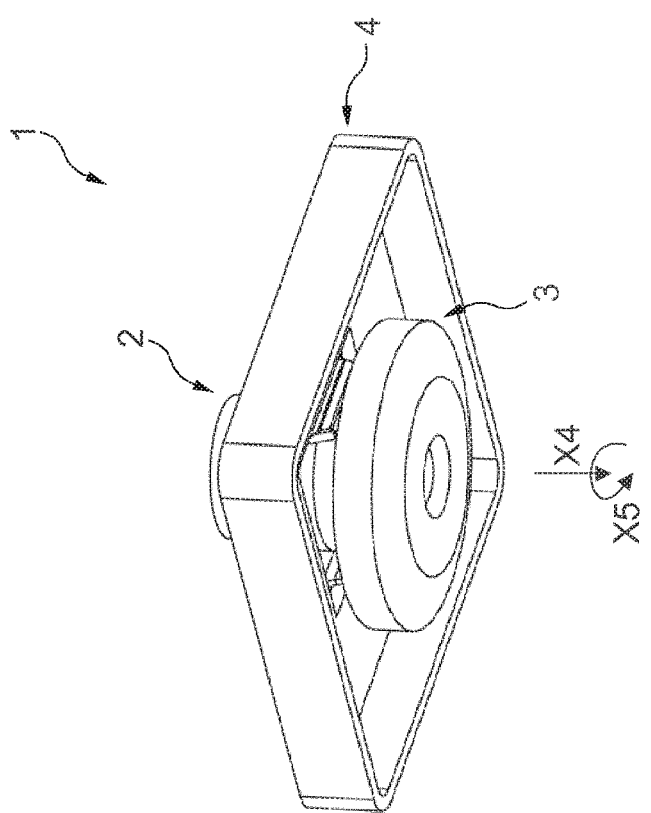
FIG. 13A a view of the fastening device on release of the blocking part from the base part.

For release, conversely, the blocking part 3 can be screwed in a screwing direction X5 opposite to the screwing direction X3 so as to come out of threaded engagement with the engagement opening 210 of the engaging portion 21 of the base part 2, so that the blocking part 3 can be removed from the base part 2 in a release direction X4, as this is shown in FIGS. 13A, 13B. Thus, the blocking part 3 can be screwingly released from the base part 2 in order to detach the fastening assembly 4 from the base part 2.

Otherwise, the exemplary embodiment of FIGS. 8A, 8B to 15A, 15B is functionally identical with the exemplary embodiment of FIGS. 1A, 1B to 7A, 7B so that reference is made to the preceding explanations.

Due to the threaded engagement between the blocking part 3 and the base part 2 an improved connection of the blocking part 3 with the base part 2 possibly is obtained, which in particular can also reliably withstand a shock load. In addition, the operability can be improved for a user, because in particular the release of the blocking part 3 by a screwing movement can be easier and more comfortable.

FIGS. 16, 17A, 17B show another exemplary embodiment in which in a modification of the exemplary embodiment of FIGS. 8A, 8B to 15A, 15B a form-fit device 221 in the form of a toothing is provided on the inside of the latching elements 22, i.e. on a side facing the engaging portion 21, which is configured to cooperate with a form-fit device 321 on a circumferentially outer side of the fixing element 32 of the blocking part 3.

The form-fit devices 221, 231 in the exemplary embodiment of FIGS. 16, 17A, 17B serve to prevent an (unwanted) rotation of the blocking part 3 with respect to the base part 2. When the blocking part 3 is fitted to the base part 2, but the fastening assembly 4 is not loaded with respect to the base part 2, the form-fit devices 221, 321 can rattle over each other and the blocking part 3 thus can be rotated relative to the base part 2 along the screwing direction X5. When the connection between the base part 2 and the fastening assembly 4 on the other hand is loaded due to the fact that a force is applied between the base part 2 and the fastening assembly 4 along the fitting direction X1, the form-fit devices 221, 321 are positively pressed into engagement with each other radially to the inside due to the load acting on the latching elements 22 so that the rotary position of the blocking part 3 with respect to the base part 2 is secured and the blocking part 3 thus cannot easily be rotated relative to the base part 2 along the screwing direction X5. The attachment of the fastening assembly 4 to the base part 2 hence is additionally secured and blocked.

Otherwise, the exemplary embodiment of FIGS. 16, 17A, 17B is functionally identical with the exemplary embodiment of FIGS. 8A, 8B to 15A, 15B.

Figure 18:
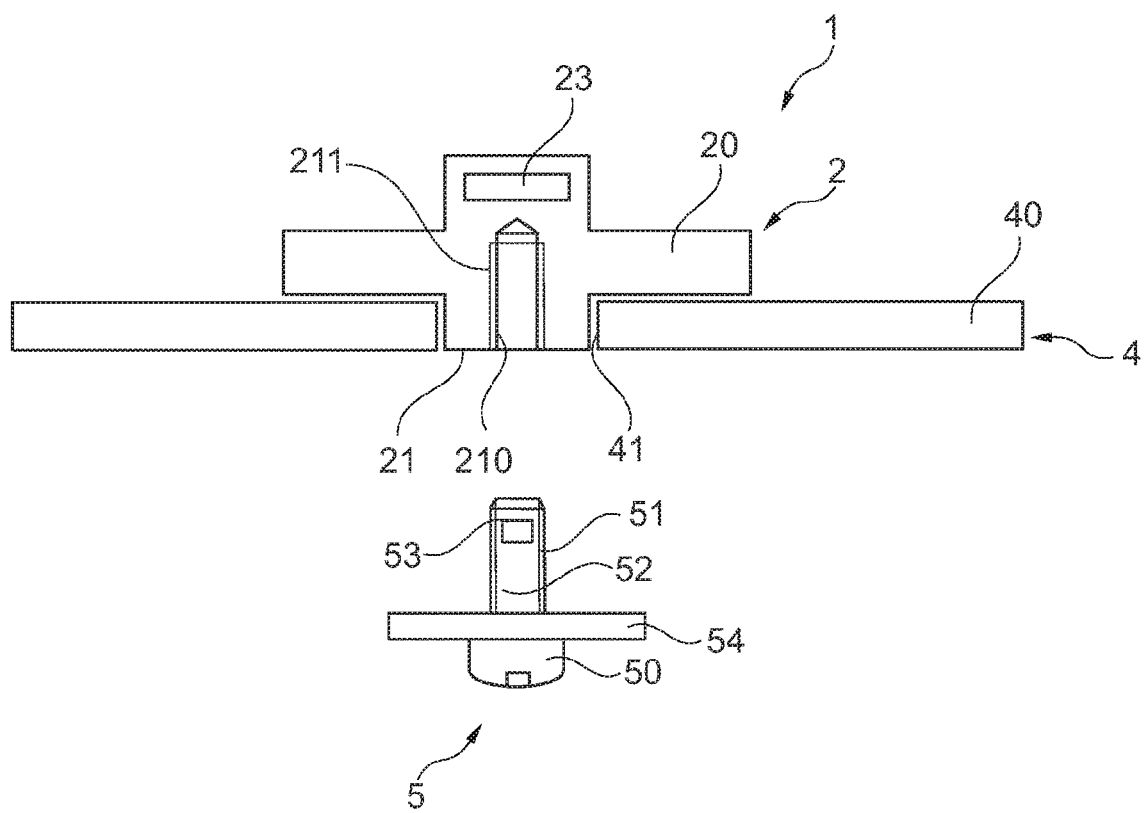
FIG. 18 a schematic view of an exemplary embodiment of a fastening device comprising a base part, a fastening assembly and a screw element for fastening the base part to the fastening assembly.

FIG. 18 shows an exemplary embodiment in which a fastening assembly 4 can be connected to a base part 2 via a screw element 5. The base part 2 in turn can be fixed to a superordinate assembly, for example a vehicle, or be part of such a superordinate assembly so that the fastening assembly 4, for example in the form of a fender of a bicycle, can be fixed via the base part 2.

The base part 2 includes a first magnetic element 23 and the screw element 5 includes a second magnetic element 53 on a shank 51 protruding from a head 50. On the shank 51 of the screw element 5 a thread 52 also is shaped in the usual way so that the screw element 5 can be screwed into an engagement opening 210 with a thread 211 shaped therein in order to fix the fastening assembly 4 to the base part 2. In the screwed position, the fastening assembly 4 is held for example between a body 20 of the base part 2 and a disk 54 through which the shank 51 of the screw element 5 extends, and is thereby fixed to the base part 2.

Due to the fact that on the base part 2 on the one hand and on the screw element 5 on the other hand a magnetic element 23, 53 each is arranged, the connection of the screw element 5 to the base part 2 is magnetically secured in the screwed position. In particular under a vibration load, the screw element 5 thus cannot inadvertently be released from the base part 2.

The idea underlying the proposed solution is not limited to the exemplary embodiments illustrated, but can also be realized in a different way.

The magnetic elements in the exemplary embodiments described above can each be configured for example as a permanent magnet. It is also conceivable, however, that the magnetic elements are configured on the one hand as a permanent magnet and on the other hand as a ferromagnetic armature. In this connection it is only decisive that a force of magnetic attraction to support the fitting of the parts to each other and/or to hold the parts against each other in a connected position is provided by the magnetic elements.

A fastening device as described here can serve for fastening entirely different fastening assemblies to entirely different superordinate assemblies. It can be advantageous to use such a fastening device on a vehicle, for example on a bicycle, for fastening a fender. However, this is not limiting.

LIST OF REFERENCE NUMERALS 1 fastening device
2 base part
20 body
21 engaging portion (peg)
210 engagement opening
211 thread
22 latching element
220 form-fit element
221 form-fit device
23 magnetic element
24 portion
3 blocking part
30 body
31 engaging element (pin)
311 thread
32 fixing element
321 form-fit device
33 magnetic element
4 fastening assembly
40 surface portion
41 fastening opening
410 edge portion
5 screw element
50 head
51 shank
52 thread 53 magnetic element
54 disk element
X1, X2 fitting direction
X3 screwing direction
X4 release direction
X5 screwing direction

The invention claimed is:

1. A fastening device, comprising:
a base part;
a fastening assembly, wherein the base part and the fastening assembly are fittable to each other along a fitting direction, and
at least one latching element which is arranged on the base part, wherein the base part and the fastening assembly in a fitted position are positively connected to each other via the at least one latching element,
wherein a blocking part, in the fitted position of the base part and the fastening assembly, is connectable to the base part, wherein the base part includes a first magnetic element and the blocking part includes a second magnetic element, the first magnetic element and the second magnetic element cooperating with each other in a magnetically attracting manner when the base part and the blocking part are engaged with one another,
wherein the blocking part includes a fixing element which is configured to cooperate with the at least one latching element in order to block the positive connection between the base part and the fastening assembly,
wherein the fastening assembly includes a fastening opening into which the at least one latching element engages in the fitted position,
wherein in the fitted position the at least one latching element is positively connected to an edge portion of the fastening assembly, which at least sectionally delimits the fastening opening,
wherein the fixing element is configured to hold the at least one latching element in engagement with the edge portion,
wherein the base part includes a first body and an engaging portion comprising an engagement opening, the engaging portion protruding from the first body, and the blocking part includes an engaging element for engaging into the engagement opening of the base part, and
wherein the blocking part comprises a second body, the fixing element protruding from the second body and extending annularly around the engaging element about the fitting direction.

2. The fastening device according to claim 1, wherein at least one of the base part includes a first thread means and the blocking part includes a second thread means, wherein the blocking part is screwingly connectable to the base part.

3. The fastening device according to claim 1, wherein the base part includes two latching elements for cooperating with opposed edge portions of the fastening assembly.

4. The fastening device according to claim 3, wherein the fixing element is arranged between the latching elements when the blocking part is connected to the base part.

5. The fastening device according to claim 1, wherein when the base part and the fastening assembly are fitted to each other, the at least one latching element is elastically deflectable and in the fitted position includes a form-fit element for producing the positive connection.

6. The fastening device according to claim 5, wherein the fixing element is configured to act on a side of the at least one latching element that faces away from the form-fit element.

7. The fastening device according to claim 1, wherein the base part or the fastening assembly includes a first form-fit device and the blocking part includes a second form-fit device to inhibit a rotation of the blocking part with respect to the base part around the fitting direction.

8. A fastening device, comprising:
a base part, a fastening assembly, and a screw element, wherein the base part and the fastening assembly are fittable to each other and in a fitted position are connected to each other via the screw element, and
at least one latching element which is arranged on the base part, wherein the base part and the fastening assembly in the fitted position are positively connected to each other via the at least one latching element,
wherein the base part includes a first magnetic element and the screw element includes a second magnetic element, which cooperate in a magnetically attracting manner,
wherein the fastening assembly includes a fastening opening into which the at least one latching element engages in the fitted position,
wherein in the fitted position the at least one latching element is positively connected to an edge portion of the fastening assembly, which at least sectionally delimits the fastening opening,
wherein the screw element includes a fixing element that is configured to hold the at least one latching element in engagement with the edge portion,
wherein the base part includes a first body and an engaging portion comprising an engagement opening, the engaging portion protruding from the first body, and the screw element includes an engaging element for engaging into the engagement opening of the base part, and
wherein the screw element comprises a second body, the fixing element protruding from the second body and extending annularly around the engaging element about the fitting direction.

* * * * *